United States Patent
Bystricky et al.

(10) Patent No.: US 7,945,901 B2
(45) Date of Patent: May 17, 2011

(54) SYSTEM AND METHOD FOR FACILITATING SOFTWARE PROFILING PROCEDURES

(75) Inventors: Juraj Bystricky, Richmond (CA); Doug McFadyen, Delta (CA)

(73) Assignee: Seiko Epson Corporation, Tokyo (JP)

( * ) Notice: Subject to any disclaimer, the term of this patent is extended or adjusted under 35 U.S.C. 154(b) by 1296 days.

(21) Appl. No.: 11/464,976

(22) Filed: Aug. 16, 2006

(65) Prior Publication Data
US 2008/0127115 A1    May 29, 2008

(51) Int. Cl.
*G06F 9/44* (2006.01)
(52) U.S. Cl. ........................................ 717/130
(58) Field of Classification Search .......... 717/128–129, 717/130; 714/1, 53, 28, 35; 710/105, 260, 710/263; 711/162, 206, 207; 712/11, 245, 712/228; 703/23, 26, 28; 716/1, 4
See application file for complete search history.

(56) References Cited

U.S. PATENT DOCUMENTS

| | | | | |
|---|---|---|---|---|
| 5,321,828 A | * | 6/1994 | Phillips et al. | 703/28 |
| 5,568,380 A | * | 10/1996 | Brodnax et al. | 700/79 |
| 5,680,542 A | * | 10/1997 | Mulchandani et al. | 714/28 |
| 5,867,696 A | | 2/1999 | Okayama et al. | |
| 5,898,859 A | * | 4/1999 | Kardach et al. | 703/23 |
| 6,142,682 A | * | 11/2000 | Skogby | 703/26 |
| 6,334,207 B1 | * | 12/2001 | Joly et al. | 716/17 |
| 6,493,820 B2 | | 12/2002 | Akkary et al. | |
| 6,567,910 B2 | | 5/2003 | Tessarolo et al. | |
| 6,598,150 B2 | * | 7/2003 | Williams et al. | 712/227 |
| 6,681,376 B1 | * | 1/2004 | Balasinski et al. | 716/4 |
| 6,735,653 B2 | * | 5/2004 | O Mathuna et al. | 710/105 |
| 6,820,192 B2 | | 11/2004 | Cho et al. | |
| 6,880,072 B1 | | 4/2005 | Giles | |

FOREIGN PATENT DOCUMENTS
WO    2005050372 A2    6/2005

* cited by examiner

*Primary Examiner* — Tuan Anh Vu
(74) *Attorney, Agent, or Firm* — Mark P. Watson

(57) ABSTRACT

A system and method for facilitating software profiling procedures in a target device includes a target CPU that executes software instructions from target routines of the target device to perform various processing tasks. A program counter of the target device is periodically updated with a current program counter value corresponding to one of the software instructions that is being currently executed by the target CPU. A shadow register is advantageously implemented in the target device to be directly accessible by profiler software on a host computer. The shadow register is periodically updated with a profiling program counter value that corresponds to the current program counter value. The profiler software may then directly and transparently access the shadow register to read the profiling program counter value for performing the software profiling procedures.

14 Claims, 8 Drawing Sheets

FIG. 3    130

SYSTEM AND METHOD FOR FACILITATING SOFTWARE PROFILING PROCEDURES

BACKGROUND SECTION

1. Field of Invention

This invention relates generally to optimizing performance characteristics of electronic devices, and relates more particularly to a system and method for facilitating software profiling procedures.

2. Description of the Background Art

Implementing effective methods for optimizing device performance is a significant consideration for designers and manufacturers of contemporary electronic devices. However, effectively optimizing performance characteristics of electronic devices may create substantial challenges for system designers. For example, enhanced demands for increased device functionality and performance may require additional system software and hardware resources. An increase in software and hardware requirements may also result in a corresponding detrimental economic impact due to increased production costs and operational inefficiencies.

Furthermore, enhanced device capability to perform various advanced processing operations may provide additional benefits to a system user, but may also place increased demands on the control and management of various device software and components. For example, an enhanced electronic device that efficiently manipulates, transfers, and displays digital image data may benefit from an efficient implementation because of the large amount and complexity of the digital data involved.

Due to growing demands on system resources and substantially increasing data magnitudes, it is apparent that developing new techniques for optimizing the performance of electronic devices is a matter of concern for related electronic technologies. Therefore, for all the foregoing reasons, developing efficient techniques for optimizing performance characteristics remains a significant consideration for designers, manufacturers, and users of contemporary electronic devices.

SUMMARY

In accordance with the present invention, a system and method are disclosed for facilitating software profiling procedures in a target device. In certain embodiments, a host computer is initially connected to the target device for purposes of performing the software profiling procedures to analyze target routines stored in a target memory of the target device. A target CPU of the target device then begins a target routine execution process to perform one or more tasks for the target device. In particular, the target CPU executes a series of software instruction from the target routines.

As each software instruction is executed, the target CPU updates a current program counter value stored in a program counter that is associated with the target CPU. In accordance with the present invention, the target CPU continues sequentially executing software instructions from the target routines, and also makes corresponding updates to the current program counter value stored in the program counter.

In accordance with the present invention, concurrent with the execution of target routines by target CPU, the host computer begins to run a profiler software program for analyzing the various target routines currently running on the target device. In certain embodiments, the host CPU of the host computer may determine whether a programmable profiling sample period has elapsed by using any effective means. For example, in certain embodiments, the profiler software program on the host computer may periodically query the target device to define the profiling sample period. Alternately, the target CPU may define the profiling sample period to commence at certain regular or irregular intervals.

The target CPU or another appropriate entity copies the current program counter value from the program counter, and stores the current program counter value into a shadow register of the target device as a profiling program counter value. Then, the profiler software program on host computer may directly and transparently access the shadow register to read the profiling program counter value as part of the profiling analysis procedures. The profiler software program may then continue to repeatedly access and read the shadow register in a similar manner to obtain additional profiling program counter values.

In accordance with the present invention, there is therefore no need to place special interrupt-profiling software in the target routines to support conventional interrupt profiling procedures. In addition, the profiler software program may be utilized to analyze target systems that do not support profiling interrupts. For at least the foregoing reasons, the present invention therefore provides an improved system and method for effectively facilitating software profiling procedures.

DETAILED DESCRIPTION

The present invention relates to an improvement in electronic devices. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for facilitating software profiling procedures in a target device, and includes a target CPU that executes software instructions from target routines of the target device to perform various processing tasks. A program counter of the target device is periodically updated with a current program counter value corresponding to one of the software instructions that is being currently executed by the target CPU. A shadow register is implemented in the target device to be directly accessible by profiler software on a host computer.

When the shadow register is read by the host CPU, the value of the shadow register is identical to the value of the target CPU program counter value. In one embodiment, this can be implemented by simultaneously updating the shadow register with the value of the target program counter whenever the value of the target CPU program counter is modified. In another embodiment, the shadow register is loaded with the value of the target program counter only when the shadow register is being read by the host CPU. The profiler software may then directly and transparently access the shadow register to read the profiling program counter value for performing the software profiling procedures.

Figure 1:
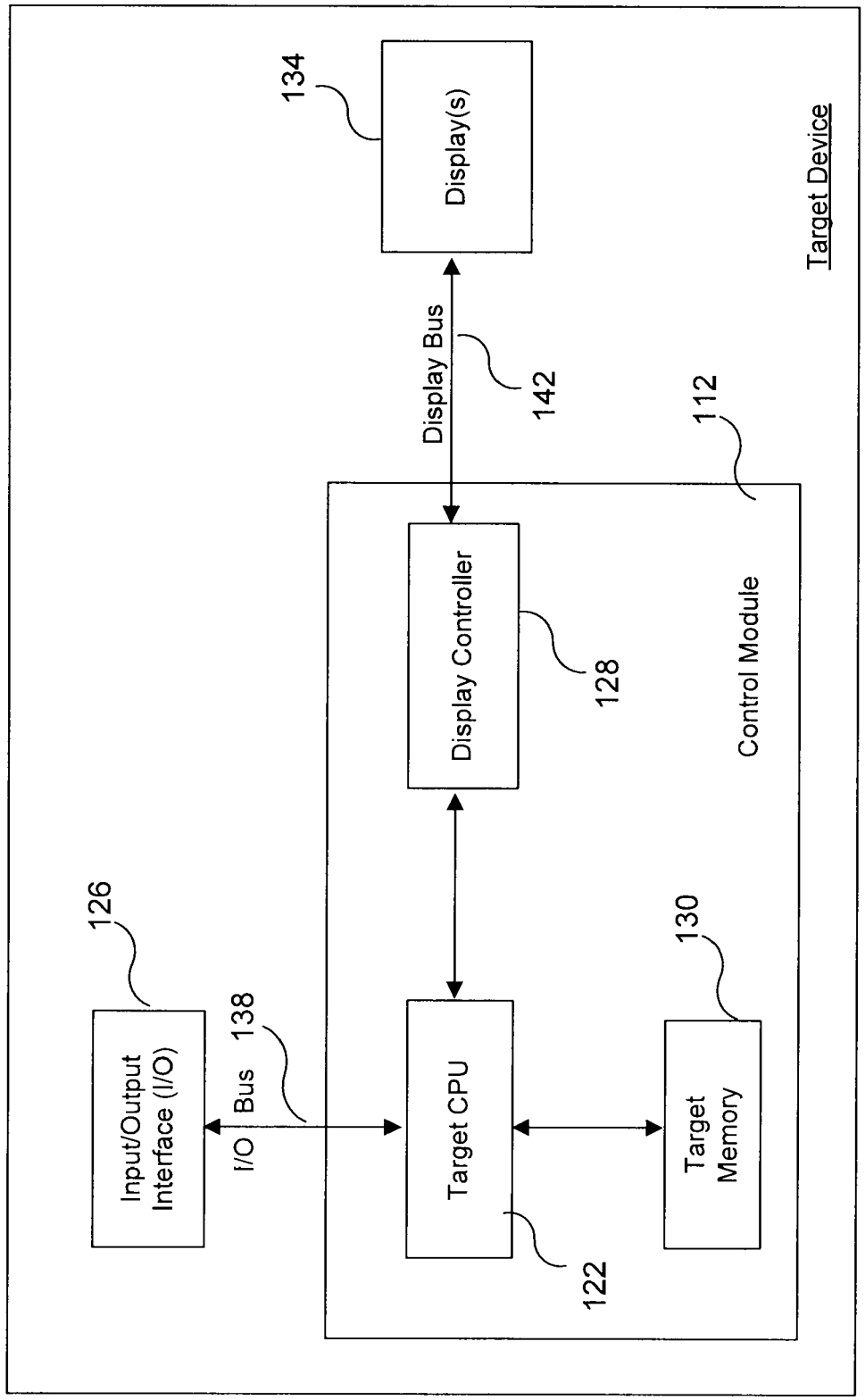
FIG. 1 is a block diagram for one embodiment of a target device, in accordance with the present invention.

Referring now to FIG. 1, a block diagram for one embodiment of a target device 110 is shown, according to the present invention. The FIG. 1 embodiment includes, but is not limited to, a target central processing unit (target CPU) 122, a target input/output interface (I/O) 126, a display controller 128, a target memory 130, and one or more display(s) 134. In alternate embodiments, target device 110 may include elements or functionalities in addition to, or instead of, certain of the elements or functionalities discussed in conjunction with the FIG. 1 embodiment.

In the FIG. 1 embodiment, target CPU 122 is implemented as an embedded processor in a control module integrated circuit 112 that also includes target memory 130 and display controller 128. In certain embodiments, target CPU 122 may alternately be configured as a non-embedded processor that is separate from target memory 130 and/or display controller 128.

In the FIG. 1 embodiment, target CPU 122 may be implemented as any appropriate and effective processor device or microprocessor to thereby control and coordinate the operation of target device 110 in response to various software program instructions or software routines. In the FIG. 1 embodiment, target memory 130 may comprise any desired storage-device configurations, including, but not limited to, random access memory (RAM), read-only memory (ROM), and storage devices such as removable memory or hard disk drives.

In the FIG. 1 embodiment, target memory 130 may include, but is not limited to, various target device routines of program instructions that are executed by target CPU 122 to perform various functions and operations for target device 110. The particular nature and functionality of the target device routines typically varies depending upon factors such as the type and specific use of the corresponding target device 110. In the FIG. 1 embodiment, the foregoing target device routines may include program instructions for allowing target CPU 122 to process and provide image data and corresponding transfer and display information to display controller 128. Display controller 128 then responsively provides the received image data via display bus 142 to at least one of the display(s) 134 of target device 110.

In the FIG. 1 embodiment, input/output interface (I/O) 126 may include one or more interfaces to receive and/or transmit any required types of information to or from target device 110. Input/output interface 126 may include one or more means for allowing a device user to communicate with target device 110. In addition, various external devices may communicate with target device 110 through I/O 126. For example, a host computer may utilize input/output interface 126 to perform a software profiling procedure to evaluate software routines running on target device 110.

In the FIG. 1 embodiment, target device 110 may advantageously utilize display controller 128 for efficiently managing various operations and functionalities relating to display(s) 134. The implementation and functionality of display controller 128 is further discussed below in conjunction with FIG. 2. In the FIG. 1 embodiment, target device 110 may be implemented as any desired type of electronic device or system. For example, in certain embodiments, target device 110 may alternately be implemented as a cellular telephone, a personal digital assistant device, an electronic imaging device, or a computer device. Various embodiments for the operation and utilization of target device 110 are further discussed below in conjunction with FIG. 3 and FIGS. 6-8.

Figure 2:
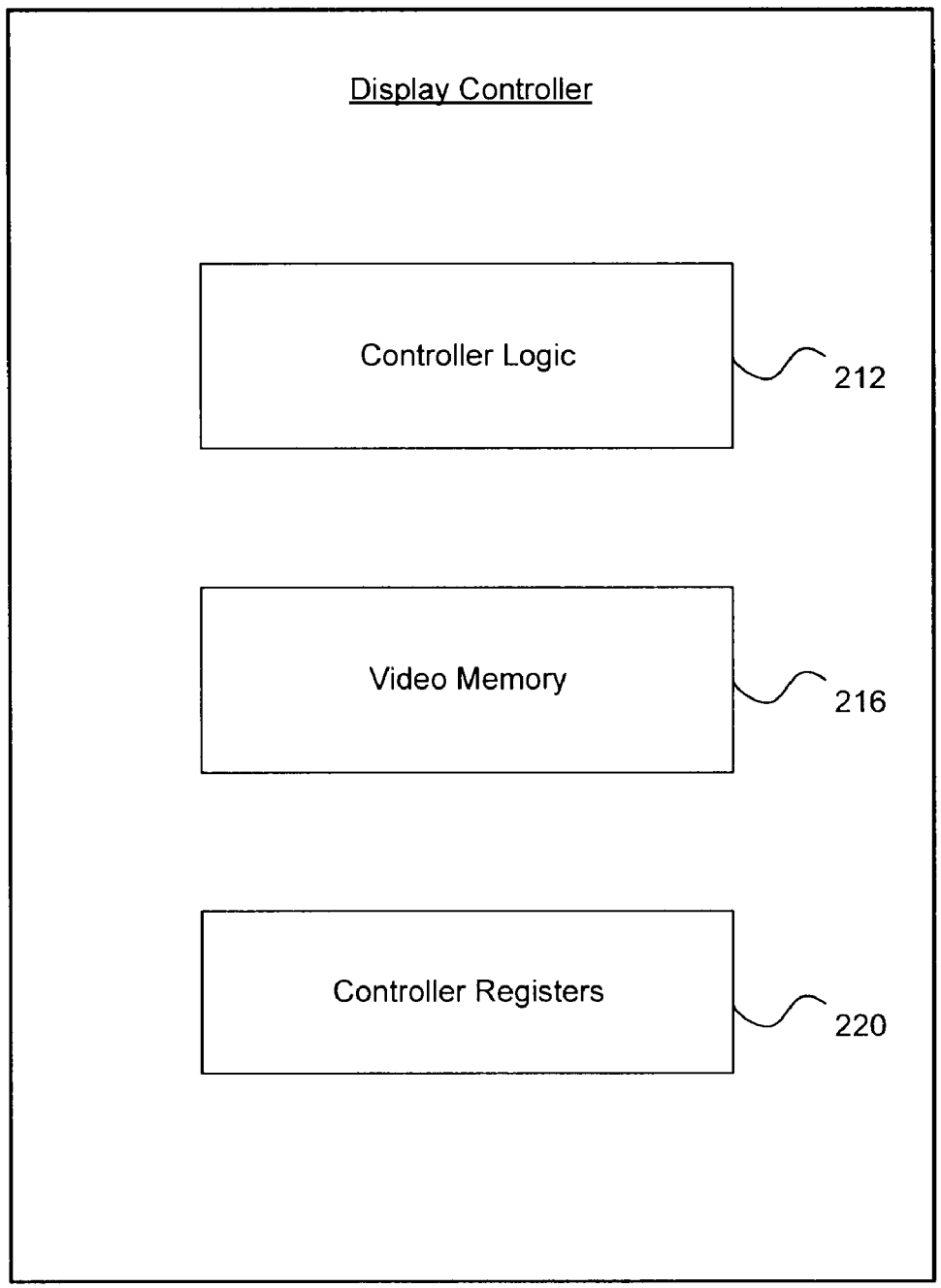
FIG. 2 is a diagram for one embodiment of the display controller of FIG. 1, in accordance with the present invention.

Referring now to FIG. 2, a diagram for one embodiment of the FIG. 1 display controller 128 is shown, in accordance with the present invention. The FIG. 2 embodiment includes, but is not limited to, controller logic 212, video memory 216, and controller registers 220. In alternate embodiments, display controller 128 may include elements or functionalities in addition to, or instead of, certain of the elements or functionalities discussed in conjunction with the FIG. 2 embodiment.

In the FIG. 2 embodiment, display controller 128 may be implemented as an electronic device that accepts image data and corresponding transfer and display information from target CPU 122 (FIG. 1). Display controller 128 then automatically provides the received image data to display 134 of target device 110 in an appropriate and efficient manner for displaying to a device user. In the FIG. 2 embodiment, controller logic 212 manages the overall operation of display controller 128. In certain embodiments, controller logic 212 may include, but is not limited to, an image creation module and a transfer module. The image creation module manages reading image data from video memory 216, and forming corresponding image pixels for display according to information from controller registers 220. The transfer module performs appropriate image data transfer operations to provide the foregoing image pixels to display 134 (FIG. 1).

Figure 3:
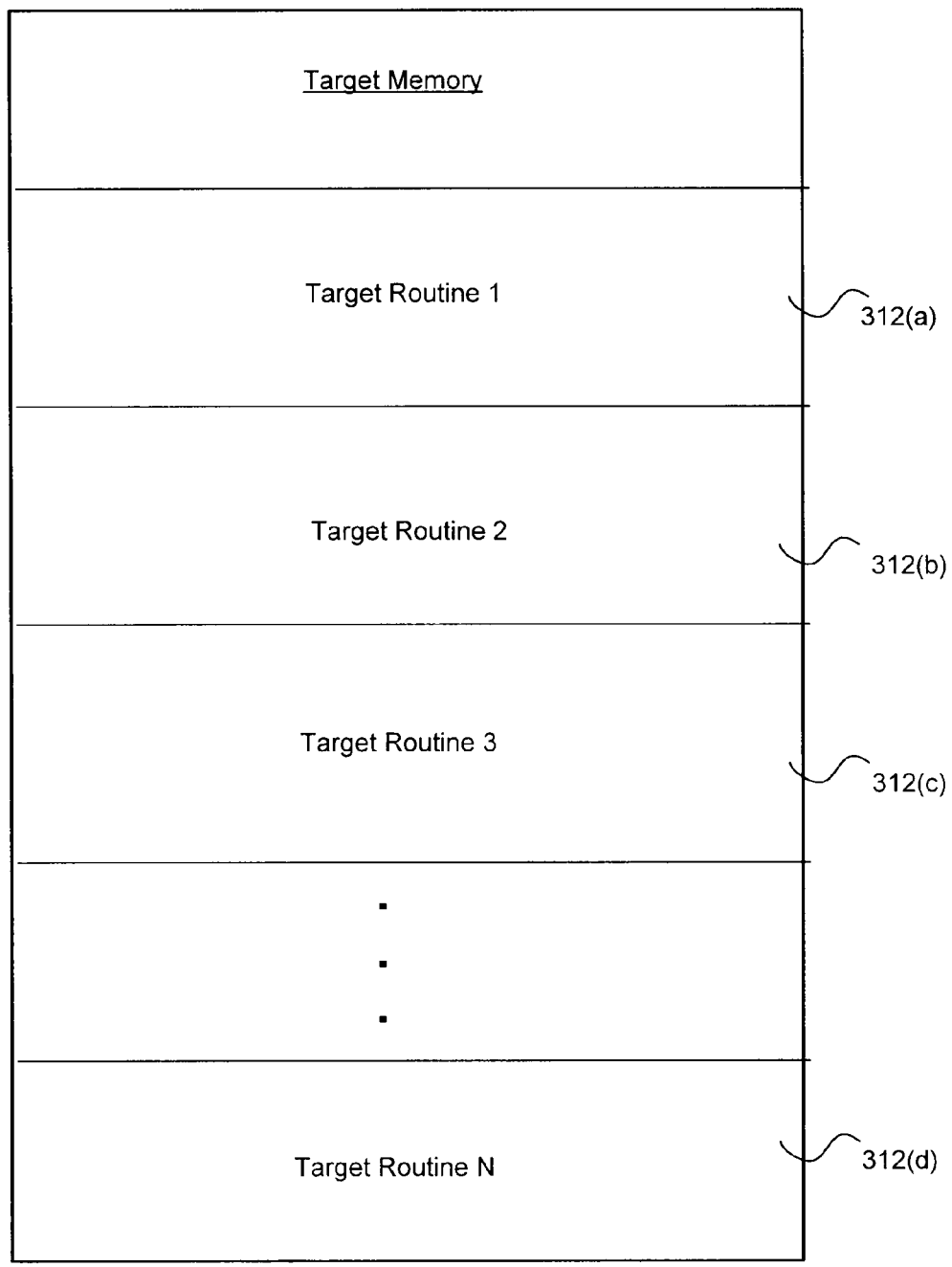
FIG. 3 is a diagram for one embodiment of the target memory of FIG. 1, in accordance with the present invention.

Referring now to FIG. 3, a diagram for one embodiment of the FIG. 1 target memory 130 is shown, in accordance with the present invention. In the FIG. 3 embodiment, target memory 130 includes, but is not limited to, a series of target routines 312(a) through 312(d). In alternate embodiments, target memory 216 may include elements and functionalities in addition to, or instead of, certain of the elements and functionalities discussed in conjunction with the FIG. 3 embodiment.

In the FIG. 3 embodiment, target routines 312 may be utilized to perform any appropriate type of task(s) for target device 110. For example, target routines 312 may encode and/or decode video information for providing to display controller 128. In general, software executing on various platforms (such as firmware or microcode) is usually constrained by the CPU of the platform. The CPU may not be powerful enough to run the software in real time. In this case, it may be more desirable to optimize the software so it can run in real time instead of upgrading the CPU. The optimization can be some form of hardware acceleration, hand-tuning individual routines of the software, or a combination of both.

The software in question can be quite complex, consisting of hundreds of different routines, and some routines are executed more often than others. Optimizing all of the routines may not be suitable, efficient, or required. The software may benefit from optimizing some routines more than others. In accordance with the present invention, to select suitable candidate target routines 312 for optimization, appropriate profiler software may effectively be used. One embodiment for implementing and utilizing profiler software is further discussed below in conjunction with FIG. 5.

Figure 4:
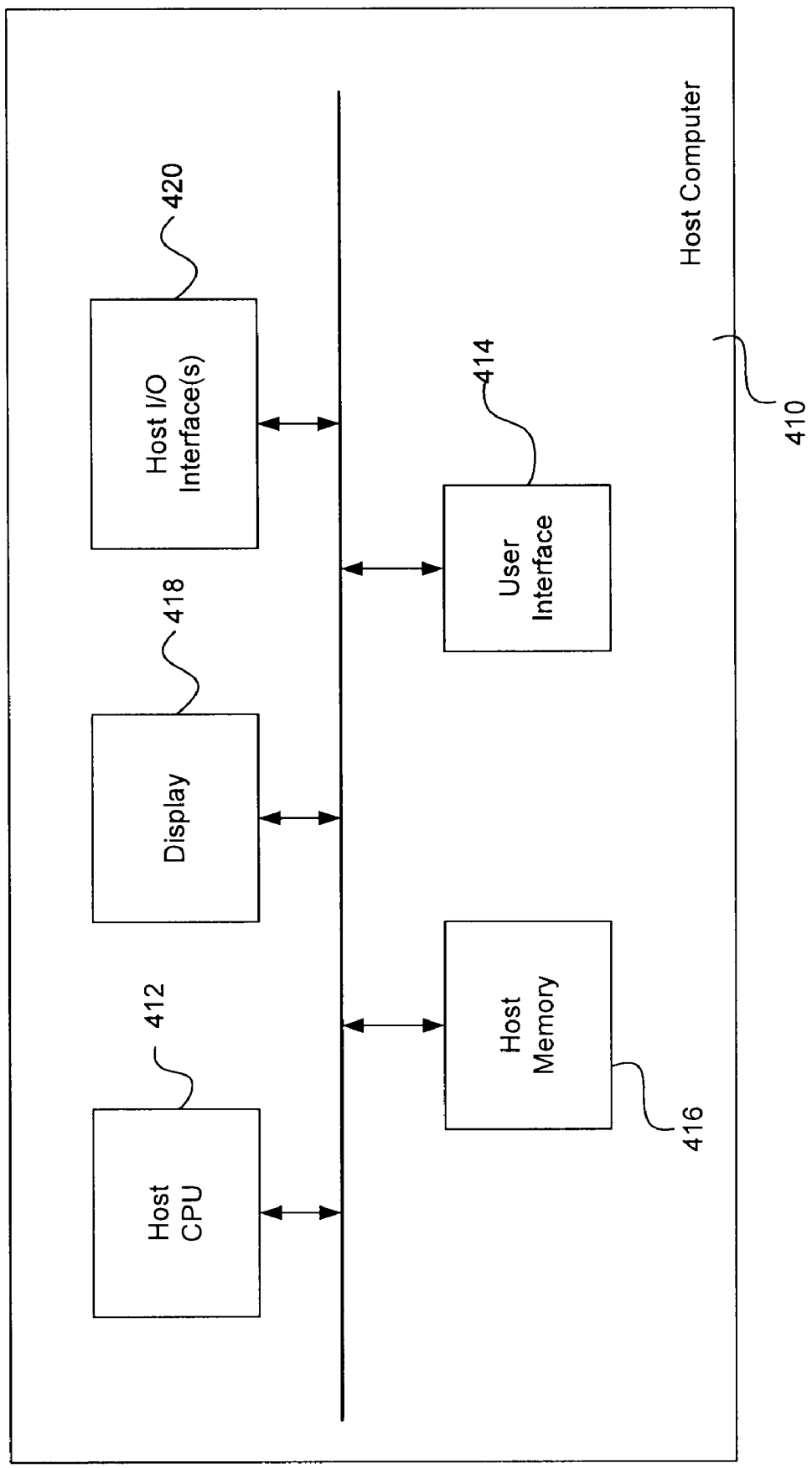
FIG. 4 is a block diagram for one embodiment of a host computer, in accordance with the present invention.

Referring now to FIG. 4, a block diagram for one embodiment of a host computer 410 is shown, in accordance with the present invention. In the FIG. 4 embodiment, host computer 410 includes, but is not limited to, a host central processing unit (host CPU) 412, a user interface 414, a host memory 416, a display 418, and host input/output interface(s) ( host I/O interface(s)) 420. In alternate embodiments, host computer 410 may readily be implemented using components and configurations in addition to, or instead of, certain of those components and configurations discussed in conjunction with the FIG. 4 embodiment.

In the FIG. 4 embodiment, host CPU 412 may be implemented to include any appropriate and compatible microprocessor device that preferably executes software instructions to control and manage the operation of host computer 410. The FIG. 4 display 418 may include any effective type of display technology including a cathode-ray-tube monitor or a liquid-crystal display device. In the FIG. 4 embodiment, host I/O interface(s) 420 may include one or more input and/or output interfaces to receive and/or transmit any types of information to or from host computer 410. In the FIG. 4 embodiment, host memory 416 may include any combination of desired storage devices, including, but not limited to, read-only memory (ROM), random-access memory (RAM), and various types of non-volatile memory, such as floppy disks or hard disks. The contents and functionality of host memory 416 are further discussed below in conjunction with FIG. 5.

Figure 5:
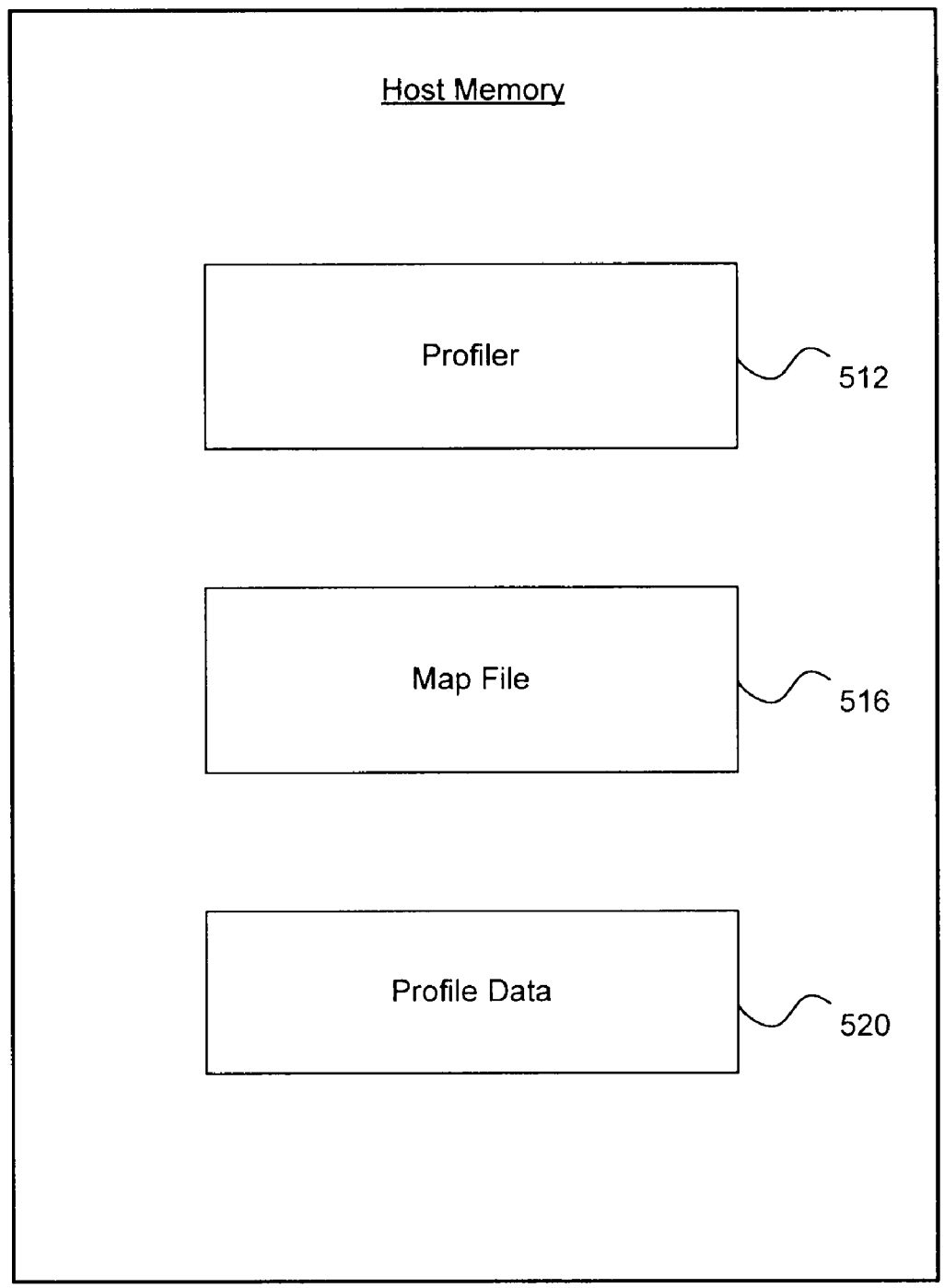
FIG. 5 is a diagram for one embodiment of the host memory of FIG. 4, in accordance with the present invention.

Referring now to FIG. 5, a diagram for one embodiment of the FIG. 4 host memory 416 is shown, in accordance with the present invention. In the FIG. 4 embodiment, host memory 416 includes, but is not limited to, a profiler 512, a map file 516, and profile data 520. In alternate embodiments, host memory 416 may readily include other components in addition to, or instead of, certain of those components discussed in conjunction with the FIG. 5 embodiment.

In the FIG. 5 embodiment, profiler 512 may include program instructions that are executed by host CPU 412 (FIG. 4) to perform various profiling procedures to analyze target routines 312 running on a target device 110 (FIG. 1). Profiler 512 is a software tool that can report time spent by executing various parts of the target routines 312 on target device 110. Profiler 512 is used when trying to improve performance by means of optimizing code, and allows for identification of specific target routines 312 that would benefit the most from optimization.

Additionally, profiler 512 may also detect if there are target routines 312 that are never called and are thus unneeded. In the FIG. 5 embodiment, profiler 512 runs on the host CPU 412 of host computer 410 that is connected to embedded target CPU 122 via a host I/O interface 420 (FIG. 4). In alternate embodiments, a similar profiler program may be run using the same target CPU 122 that executes the profiled target routines 312.

When profiled target routines 312 are executed, the profiled target CPU 122 executes a corresponding series of software instructions located somewhere within target memory 130 of the profiled target device 110. The storage locations (memory addresses) of these software instructions are sequentially and temporarily stored in a local internal register called a program counter. Profiler 512 periodically obtains a current value from the program counter, and based on a map file 516, profiler 512 determines the specific target routine 312 to which the current program counter value corresponds.

Map file 516 is a special file created by the same or similar tools as those that created the profiled target routines 312, and contains information about where in target memory 130 the various target routines 312 are stored. For example, in case of software with three routines, the map file 516 may contain the following information:

| Name | Address | Size |
|---|---|---|
| RoutineA | 0x0001000 | 0x036 |
| RoutineB | 0x0001036 | 0x100 |
| RoutineC | 0x0002000 | 0x128 |

In the foregoing example, if profiler 512 obtains a program counter value that is equal to 0x0002008, then profiler 512 may determine that the current software instruction being executed belongs to RoutineC. By periodical querying the value of the program counter, profiler 512 maintains statistics about how much total time is spent in each target routine 312. Profiler 512 may then store the foregoing statistics as profile data 520. The target routines 312 that consume the most time from target CPU 122 are the prime candidates for optimizations. For example, if profiler 512 shows that the target CPU 122 spent 70% of the time in RoutineB, 28% time in RoutineC, and 2% of the time in RoutineA, then it would be most effective to focus on optimizing RoutineB rather than RoutineA.

Unlike the present invention, in certain conventional software design environments, obtaining the program counter value of a profiled CPU may be difficult or sometimes not even possible. In typical electronic devices, only the device CPU has direct access to its corresponding program counter. In order to obtain the program counter value, the profiled software must be momentarily stopped so that the device CPU can execute special code that obtains the value of local program counter, reports the value of program counter to the profiling software, and then resumes executing the halted profiled software.

For example, a profiling CPU may issue an interrupt to force the execution of interrupt-handling code on the profiled CPU. This interrupt-handling code may then probe its own return address to determine the value of the program counter at the time of the interrupt. This process is only possible if the profiled device supports interrupts, the interrupts are enabled, and the interrupts allow nesting. However, this interrupt method still affects the profiled code by stopping/interrupting its execution periodically. Therefore the profiled code may behave differently from performance of the same code when not being profiled. Various improved techniques for solving the foregoing problems are further discussed below in conjunction with FIGS. 6-8.

Figure 6:
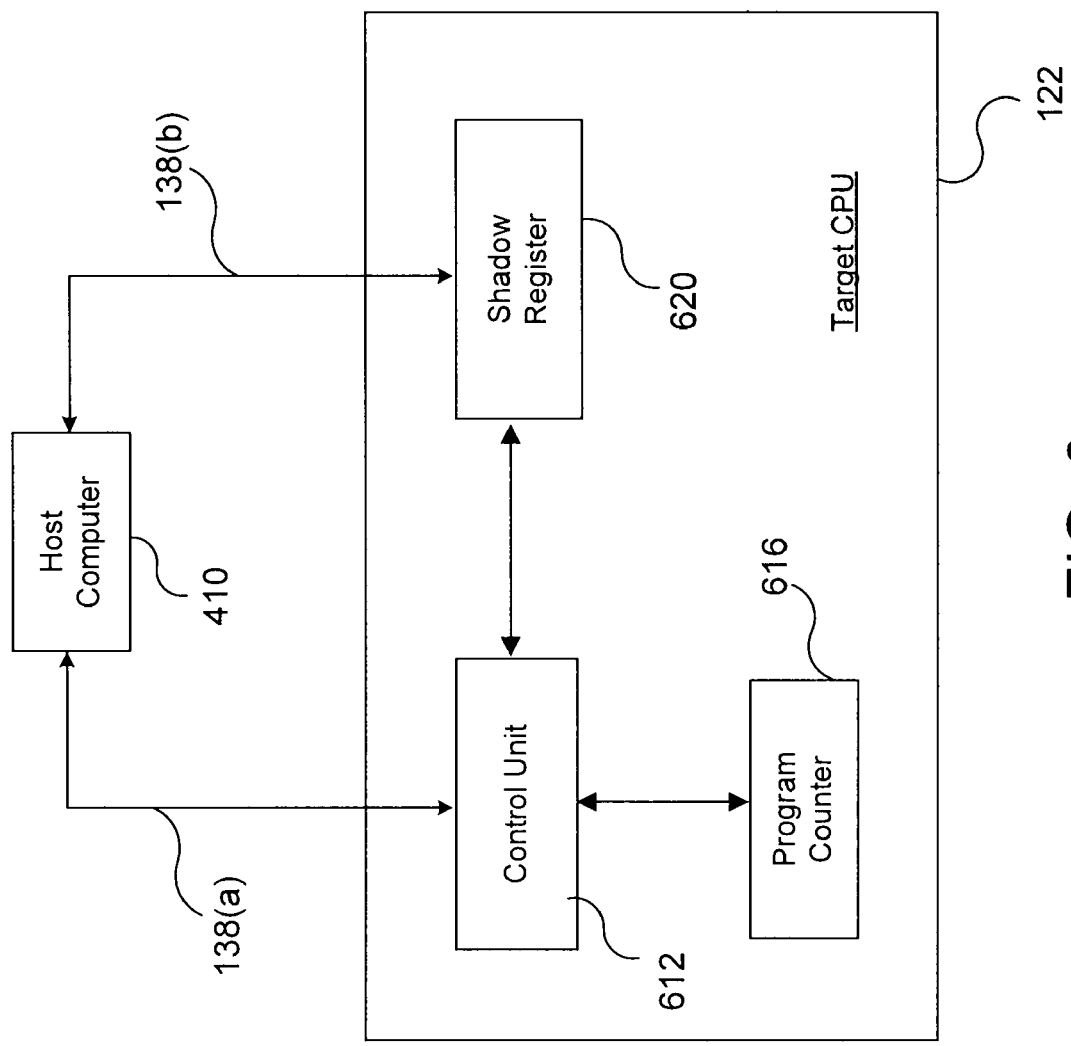
FIG. 6 is a block diagram for one embodiment of the target CPU of FIG. 1, in accordance with the present invention.

Referring now to FIG. 6, a block diagram for one embodiment of the FIG. 1 target CPU 122 is shown, in accordance with the present invention. In the FIG. 6 embodiment, target CPU 122 includes, but is not limited to, a control unit 612, a program counter 616, and a shadow register 620. In alternate embodiments, target CPU 122 may include elements and functionalities in addition to, or instead of, certain of the elements and functionalities discussed in conjunction with the FIG. 6 embodiment.

In the FIG. 6 embodiment, control unit 612 may include any appropriate means for effectively controlling and coordinating the overall functionality of target CPU 122. For example, control unit 612 may control the execution of software instructions from various target routines 312 (FIG. 3) for performing corresponding tasks for target device 110. In the FIG. 6 embodiment, program counter 616 temporarily stores a current program counter value that represents the memory address in target memory 130 for a corresponding software instruction from target routines 312 that is currently being executed by target CPU 122. In the FIG. 6 embodiment, control unit 612 sequentially updates the current program counter value in program counter 616 as each software instruction from target routines 312 is executed.

In the FIG. 6 embodiment, host computer 410 may communicate with control unit 612 via path 138(a) for any appropriate purpose(s). As discussed above in conjunction with FIG. 5, host computer 410 may perform various types of software profiling procedures with a profiler 512 to evaluate target routines 312 being executed by target CPU 122. In particular, host computer 410 may periodically poll or query target CPU to learn the current program counter value stored in program counter 616.

However, as discussed above in conjunction with FIG. 5, in conventional profiling procedures, to obtain a current program counter value, a target device typically must issue an interrupt to halt execution of the profiled routines, and then access the current program counter value for providing to the profiling program. Since profiling queries may occur at a relatively high frequency, this frequent interruption may have a detrimental effect on the operation of the profiled device.

In accordance with the present invention, in order to avoid the foregoing problems, target CPU 122 advantageously utilizes shadow register 620 to provide host computer 410 with direct access to current program counter values via path 138(b) without interfering with the operation of program counter 616. In the FIG. 6 embodiment, control unit 612 periodically copies a current program counter value from program counter 616, and then stores the copied current program counter value into shadow register 620 for direct and transparent access by host computer 410.

In certain embodiments, control unit 612 may copy current program counter values from program counter 616 to shadow register 620 in response to corresponding profiling queries from host computer 410. In alternate embodiments, shadow register 620 may be implemented in conjunction with control unit 612 to always contain a software address value that corresponds to the current contents of program counter 616. In the FIG. 6 embodiment, program counter 616 and shadow register 620 are shown as part of target CPU 122, however in other embodiments, program counter 616 and/or shadow register 620 may be implemented in manner external to target CPU 122. The implementation and utilization of target CPU 122 is further discussed below in conjunction with FIGS. 7 and 8.

Referring now to 7A and 7B, diagrams of the FIG. 6 program counter 616 and the FIG. 6 shadow register 620 are shown, in accordance with one embodiment of the present invention. In alternate embodiments, program counter 616 and shadow register 620 may include elements and functionalities in addition to, or instead of, certain of the elements and functionalities discussed in conjunction with the FIG. 7 embodiments.

Figure 7A:
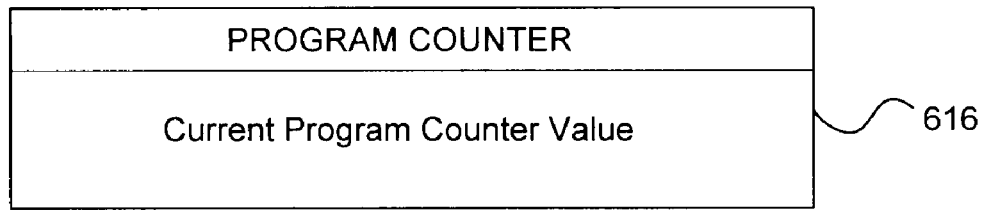
FIGS. 7A and 7B are diagrams of the program counter and the shadow register of FIG. 6, in accordance with one embodiment of the present invention.
Figure 7B:
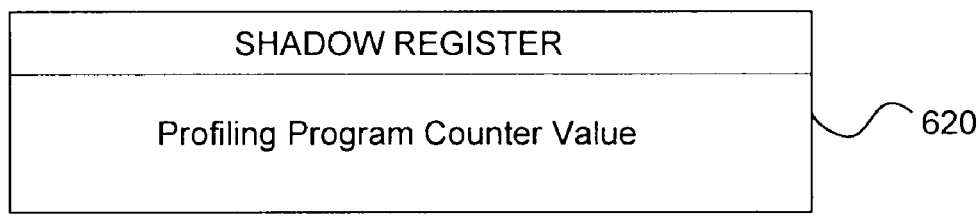

In the FIG. 7A embodiment, program counter 616 is shown storing a current program counter value that represents a memory address of a software instruction from target routines 312. In the FIG. 7B embodiment, shadow register 620 is shown storing a profiling program counter value that has been copied from program counter 616 by using any appropriate and effective techniques. For example, control unit 612 of target CPU 122 may update shadow register 620, or alternately, shadow register 620 may access program counter 616 directly to obtain and store the profiling program counter value.

As discussed above in conjunction with FIG. 6, host computer 410 may then directly access the profiling program counter value from shadow register 620 to perform corresponding profiling analyses with respect to target routines of target device 110 (FIG. 1). Although the FIG. 7 embodiments show program counter 616 and shadow register 620 as two separate entities, in certain embodiments, program counter 616 and shadow register 620 may alternately be implemented as a single combined program counter/profiling register that is directly exposed to access by host computer 410 without interrupting target routines 312 that are executing on target CPU 122. The operation and utilization of shadow register 620 is further discussed below in conjunction with FIG. 8.

Figure 8:
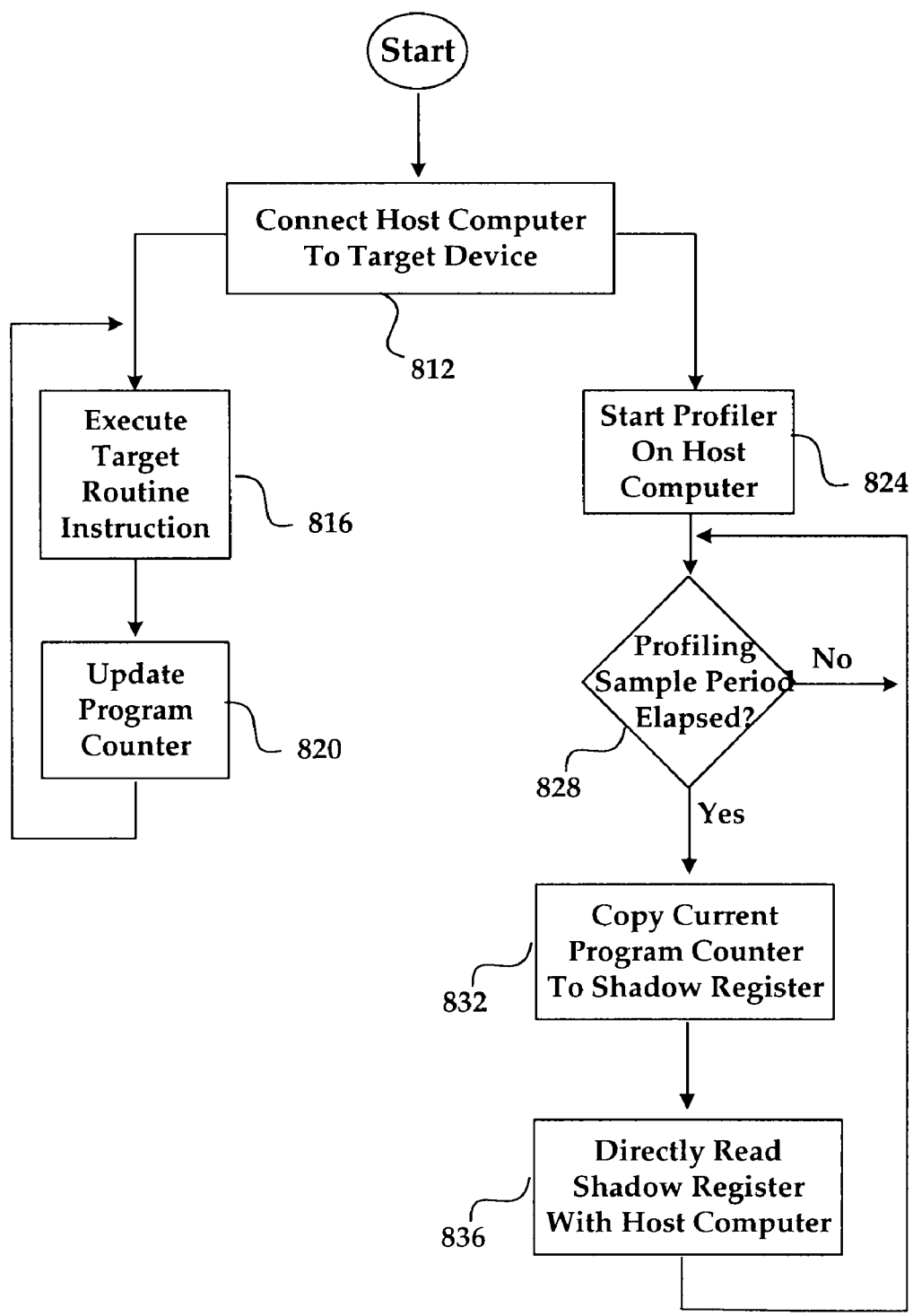
FIG. 8 is a flowchart of method steps for utilizing the shadow register of FIG. 6, in accordance with one embodiment of the present invention.

Referring now to FIG. 8, a flowchart of method steps for utilizing the FIG. 6 shadow register 620 is shown, in accordance with one embodiment of the present invention. The FIG. 8 flowchart is presented for purposes of illustration, and in alternate embodiments, the present invention may utilize steps and sequences in addition to, or instead of, certain of the steps and sequences discussed in conjunction with the FIG. 8 embodiment.

In the FIG. 8 embodiment, in step 812, a host computer 410 is initially connected to a target device 110 for purposes of performing a software profiling procedure to analyze target routines 312 stored in a target memory 130 of target device 110. Then, a target CPU 122 of target device 110 begins a target routine execution process to perform one or more tasks for target device 110. In particular, in step 816, target CPU 122 executes a software instruction from target routines 312.

In step 820, target CPU 122 then updates a current program counter value stored in a program counter 616 that is associated with target CPU 122. In accordance with the present invention, target CPU 122 may then continue without any interruption from the host computer 410 to execute additional software instructions from target routines 312, and to also make corresponding updates to the current program counter value stored in program counter 616.

In the FIG. 8 embodiment, in a manner concurrent with the execution of target routines 312 discussed in foregoing steps 816 and 820, host computer 410 begins in step 824 to run a profiler software program 512 for analyzing the various target routines 312 of target device 110. In step 828, profiler 512 on host computer 410 determines whether a predefined programmable profiling sample period has elapsed by using any effective means. For example, in certain embodiments, profiler software program 512 on host computer 410 may periodically query target CPU 122 for the value of program counter 616. Alternatively, since profiling is based on statistical approach, profiling sample period can commence at irregular intervals.

If the profiling sample period has elapsed, then in step 832, target control unit 612 or another appropriate entity copies the current program counter value from program counter 616, and stores the current program counter value into a shadow register 620 of target device 110 as a profiling program counter value. Then, in step 836, profiler software program 512 on host computer 410 may directly and transparently access shadow register 620 to read the profiling program counter value as part of the profiling analysis procedure of target routines 312. The profiling analysis procedure may then repeatedly return to steps 828 through 836 for reading shadow register 620 to obtain additional profiling program counter values.

In accordance with the present invention, there is therefore no need to place special interrupt-profiling software in target routines 312 to support conventional interrupt profiling procedures. In addition, the profiled target routines 312 are completely unaware of being profiled, so it is possible to profile the initial release version of target routines 312, and not have to later remove the special interrupt-profiling software that supports interrupt profiling. Furthermore, profiler 512 may be utilized to analyze target systems that do not support interrupts, do not have available interrupts, or do not support nested interrupts.

In accordance with the present invention, profiling procedures using shadow register 620 will advantageously have no affect on execution of profiled target routines 312. The profiled target routines 312 will execute exactly the same as target routines 312 that are not being profiled. Target routines 312 that have an available map file 516, but have no available source code, may also be profiled, thus protecting proprietary software. For example, a system user or other appropriate entity could perform profiling procedures on a target device without requiring confidential source code.

Therefore, the present invention advantageously allows profiling of target systems that have no interrupts available. The present invention also allows profiling of actual release code without requiring the profiled release code to have special support to allow profiling. In addition, the process of profiling does not affect the execution of the profiled code. Furthermore, the present invention may also remove the need to recompile code for profiling, especially since some firmware may be in a FLASH device, which can take significant time to reload for every recompile process. For at least the foregoing reasons, the present invention therefore provides an improved system and method for effectively facilitating software profiling procedures.

The invention has been explained above with reference to certain preferred embodiments. Other embodiments will be apparent to those skilled in the art in light of this disclosure. For example, the present invention may be implemented using certain configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for facilitating software profiling procedures in a target device, comprising:
   a target CPU that executes software instructions from target routines of said target device;
   a program counter that is periodically updated with a current program counter value corresponding to one of said software instructions that is being executed by said target CPU;
   a shadow register that is directly accessible for performing said software profiling procedures, said shadow register containing a profiling program counter value that corresponds to said current program counter value; and
   a profiler that directly accesses said shadow register, said profiler including a profiling software program that runs on a host computer or said target CPU; and
   wherein
   a programmable profiling sample period is defined to specify sampling intervals for said profiler to access said shadow register;
   said profiler generates a sampling query to said target CPU for determining said current program counter value at the end of each of said sampling intervals;
   a control unit of said target CPU copies said current program counter value in response to said sampling query, said control unit then writing said current program counter value into said shadow register as said profiling program counter value;
   said profiler identifies a specific one of said target routines corresponding to said profiling program counter value by referencing a map file; and
   said software profiling procedures are performed upon a release version of said target routines that does not include a special profiling-support routine.

2. The system of claim 1 wherein said target CPU is embedded in a control integrated circuit that also includes said program counter and said shadow register.

3. The system of claim 1 wherein said target device is implemented in an automotive device.

4. The system of claim 1 wherein said target CPU executes said target routines without interruption by said profiler while said software profiling procedures occur.

5. The system of claim 1 wherein said profiler generates profile data about said target routines, said profile data including statistical execution frequencies of said target routines, said profile data being utilized to determine which of said target routines to optimize.

6. The system of claim 1 wherein said target CPU executes said target routines to process image data, said target CPU then providing said image data to a display controller device for transmitting to a display device.

7. The system of claim 1 wherein said profiler directly accesses said shadow register during said software profiling procedures to transparently analyze said target routines, while said target CPU concurrently executes said software instructions and updates said program counter in a sequential and uninterrupted manner to perform normal processing tasks for said target device.

8. The system of claim 1 wherein said profiler directly accesses said shadow register to read said profiling program counter value without intervention by said target CPU.

9. The system of claim 1 wherein said current program counter value represents a memory address of one of said software instructions stored in a target memory of said target device.

10. The system of claim 1 wherein a control unit of said target CPU updates said shadow register with a new profiling program counter value as each of said software instructions is executed.

11. The system of claim 1 wherein said program counter and said shadow register are implemented as a single unified program counter/profiling register that is exposed to said profiler for direct accesses without intervention by said target CPU.

12. The system of claim 1 wherein said target CPU and said target routines of said target device do not support profiling interrupts.

13. The system of claim 1 wherein said software profiling procedures are transparent to said target CPU, said software profiling procedures having no effect upon executing said target routines with said target CPU.

14. A method for facilitating software profiling procedures in a target device, comprising:
   executing software instructions from target routines of said target device by using a target CPU;
   updating a program counter with a current program counter value corresponding to one of said software instructions that is being executed by said target CPU;
   providing a shadow register that is directly accessible by a profiler for performing said software profiling procedures, said shadow register being updated with a profiling program counter value that corresponds to said current program counter value;

providing a profiler that directly accesses said shadow register, said profiler including a profiling software program that runs on a host computer or said target CPU;

defining a programmable profiling sample period to specify sampling intervals for said profiler to access said shadow register;

generating a sampling query by said profiler to said target CPU for determining said current program counter value at the end of each of said sampling intervals;

copying said current program counter value by a control unit of said target CPU in response to said sampling query, then writing said current program counter value by said control unit into said shadow register as said profiling program counter value;

identifying, by said profiler, a specific one of said target routines corresponding to said profiling program counter value by referencing a map file; and performing said software profiling procedures upon a release version of said target routines that does not include a special profiling-support routine.

* * * * *